UNITED STATES PATENT OFFICE 2,263,526

NITROCELLULOSE-POLYVINYLFORMAL COMPOSITION

Kurt Thinius, Eilenburg, Germany, assignor, by mesne assignments, to Walther H. Duisberg, New York, N. Y.

No Drawing. Application August 17, 1938, Serial No. 225,350. In Germany August 27, 1937

4 Claims. (Cl. 260—17)

The present invention relates to a method of combinedly working nitrocellulose and polyvinylformal and the compositions of matter obtained thereby.

The polyvinyl formals, which are obtained by a saponifying acetalization from polyvinyl acetate are soluble in only a few solvents and these are not wholly harmless from the physiological aspect. Their technical application has accordingly been subject to considerable limitation, the more so because the plasticizing of the products on preheated rollers has not been possible with any success. Since the solvents for the polyvinyl formal do not dissolve nitrocellulose it has not hitherto been possible to work up these two film-forming substances in combination.

It is therefore an object of the present invention to provide a method which renders possible the combined working up of nitrocellulose and polyvinyl formal.

A further object consists in a method of jointly dissolving nitrocellulose and polyvinylformal.

An additional object is the provision of new compositions of matter which are capable of forming self supporting films.

A further object resides in the provision of films of decreased inflammability and of high elasticity in comparison with pure nitrocellulose films, and increased tensile strength compared with pure polyvinylacetal films.

Still further objects of the invention will become apparent as the following description proceeds.

I have found that these objects may be accomplished by dissolving the mixture of nitrocellulose and polyvinylformal in a mixture of at least two solvents of which one is an aromatic hydrocarbon which is a non-solvent both for the polyvinyl formal and for the nitrocellulose, whilst the other contains an alcoholic hydroxyl group and likewise does not dissolve the polyvinyl formal but dissolves the nitrocellulose wholly or in part.

To the latter group of solvents there belong for example from the class of alcohols: methanol and ethanol; from the group of ethers: monomethylethylene glycol, monoethylethylene glycol and so on; and from the group of esters: ethyl lactate, butyl lactate, mandelic acid methyl ester and so on. Two or more of the solvents containing hydroxyl groups may be used as the second component of the solvent mixture.

With the aid of such a mixture of solvents polyvinyl formal and nitrocellulose of any desired content of nitrogen can be worked up together into varnishes, films, Celluloid, adhesives, artificial leather, gramophone records, impregnating solutions and the like. A diluent, such as a benzine or butanol, may be added to the solutions of the two film-forming substances up to a certain degree which depends on the relative proportions of the film-forming substances. It will be understood that dyestuffs, pigments and other filling agents may be incorporated according to the purpose for which the final product is intended.

Apart from the reduction in the inflammability of nitrocellulose foils which results from working up the nitrocellulose in combination with a polyvinyl formal, a further advantage of working up the two substances together is to be found in the fact that the high elastic properties of the polyvinyl formal are retained in the mixture, without the addition of a particular softening agent being necessary. Naturally this does not exclude the addition of softening agents for particular purposes, for example, for the manufacture of artificial leather, but there is no danger that the softening point of layers containing a softening agent will be considerably lowered, as is otherwise the case with polyvinyl compounds. The addition of nitrocellulose to the polyvinyl formal furthermore results in quite a considerable increase in the tensile strength of the mixed films in comparison with films of polyvinyl acetals alone.

In the following examples given in illustration of the invention, the parts are by weight.

Example 1

For preparing Celluloid 100 kilos of polyvinyl formal and 100 kilos of nitrocellulose containing 10.9 per cent of nitrogen are kneaded whilst gently warming in a kneading machine together with 450 kilos of a mixture of ethanol of 94 per cent strength and toluene in the proportion 1:1, in which 10 kilos of camphor have been dissolved. When the whole has become homogeneous it is further worked up in the manner usual in the manufacture of Celluloid.

Example 2

5 parts of polyvinyl formal and 3 parts of nitrocellulose of high viscosity containing 12 per cent of nitrogen are dissolved in a mixture of methyl glycol and toluene in the proportion 2:3 to produce a solution of 20 per cent strength. After de-aeration the solution is cast on a drum- or a band-casting machine to produce a film which may serve as a support for photographic emulsions or as an intermediate layer for safety glass.

Example 3

There are separately prepared a solution of 20 per cent strength of a nitrocellulose of low viscosity containing 11.87 per cent of nitrogen in a mixture of absolute ethanol, ethylglycol and xylene in the proportion 10:3:7 and a solution of 20 per cent strength of a polyvinyl formal of low viscosity in a mixture of methyl glycol and benzene in the proportion 7:3 and the two solutions are mixed in the proportion 6:4. There is produced a clear solution of the polyvinyl formal and nitrocellulose which can be used either as a painting varnish or may be applied by means of a spraying pistol, for which purpose it may advantageously be diluted somewhat with butanol. If necessary some resin (natural or artificial) may be added to the varnish to improve the adherence of the coatings.

Example 4

For the production of artificial leather 10 parts of nitrocellulose of medium nitrogen content and 10 parts of polyvinyl formal of high viscosity are kneaded with a mixture of methanol and benzene in the proportion 6:4 with the addition of 50 per cent of a softening agent (a phosphoric acid ester, a phthalic acid ester, etc.) and 100 per cent of Chestnut Brown and the preparation so obtained is coated on a support.

I claim:

1. The method of dissolving a mixture of nitrocellulose and polyvinylformal to a clear solution, which comprises treating the mixture with a liquid aromatic hydrocarbon incapable of dissolving either nitrocellulose or the polyvinylformal, and an alcoholic hydroxyl-containing solvent for the nitrocellulose, said hydroxyl-containing solvent being incapable per se of dissolving the polyvinylformal, until dissolution of the mixture occurs.

2. The method of dissolving a mixture of nitrocellulose and polyvinylformal to a clear solution, which comprises treating the mixture with a liquid aromatic hydrocarbon incapable of dissolving either nitrocellulose or the polyvinylformal, and more than one alcoholic hydroxyl-containing solvent for the nitrocellulose in admixture, said hydroxyl-containing solvents being incapable per se of dissolving the polyvinylformal, until dissolution of the mixture occurs.

3. As a composition of matter a clear solution capable of forming a self supporting film, said solution comprising nitrocellulose, polyvinylformal, a liquid aromatic hydrocarbon incapable of dissolving either nitrocellulose or the polyvinylformal, and an alcoholic hydroxyl-containing solvent for the nitrocellulose, incapable per se of dissolving the polyvinylformal.

4. A composition of matter consisting of a clear solution containing nitrocellulose, polyvinylformal, a liquid aromatic hydrocarbon of the benzene series and an alcoholic hydroxyl-containing solvent for the nitrocellulose, incapable per se of dissolving the polyvinylformal.

KURT THINIUS.